(12) United States Patent
Hong et al.

(10) Patent No.: US 12,641,109 B2
(45) Date of Patent: May 26, 2026

(54) INFERENCE OF VULNERABLE ENDPOINTS TO A SECURITY THREAT

(71) Applicant: Cisco Technology, Inc., San Jose, CA (US)

(72) Inventors: Yi Hong, Foster City, CA (US); Tian Bu, Basking Ridge, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 329 days.

(21) Appl. No.: 18/410,578

(22) Filed: Jan. 11, 2024

(65) Prior Publication Data

US 2025/0233880 A1     Jul. 17, 2025

(51) Int. Cl.
H04L 9/40          (2022.01)

(52) U.S. Cl.
CPC ...... H04L 63/1433 (2013.01); H04L 63/1416 (2013.01)

(58) Field of Classification Search
None
See application file for complete search history.

(56) References Cited

U.S. PATENT DOCUMENTS

| | | | |
|---|---|---|---|
| 2016/0232358 A1 | 8/2016 | Grieco | |
| 2017/0346846 A1* | 11/2017 | Findlay | ............... H04L 63/1433 |
| 2018/0212997 A1* | 7/2018 | Ahuja | ................. H04L 63/1416 |
| 2019/0012252 A1* | 1/2019 | Kapoustin | ........... G06F 11/3452 |
| 2021/0182404 A1 | 6/2021 | Shackleton | |
| 2022/0417264 A1 | 12/2022 | Moon | |
| 2023/0252140 A1 | 8/2023 | Coulter | |
| 2023/0336581 A1 | 10/2023 | Dunn | |
| 2024/0095350 A1* | 3/2024 | Withnell | ............... G06F 21/554 |
| 2024/0098100 A1* | 3/2024 | Lal | ....................... H04L 63/1491 |
| 2024/0223596 A1* | 7/2024 | Sellars | ............... H04L 63/1433 |
| 2024/0333743 A1* | 10/2024 | Bazalgette | .......... H04L 63/1416 |
| 2024/0414211 A1* | 12/2024 | Boyer | ................. H04L 63/1416 |

OTHER PUBLICATIONS

CVE, The MITRE Corporation, retrieved Dec. 1, 2023 from <https://cve.mitre.org/>, 1 page.

(Continued)

*Primary Examiner* — Joseph P Hirl
*Assistant Examiner* — Hassan Saadoun
(74) *Attorney, Agent, or Firm* — Lee & Hayes, P.C.

(57) ABSTRACT

Techniques described herein can efficiently detect network endpoints that are vulnerable to individual security threats. New security threats are constantly emerging. Identifying endpoints that are vulnerable to a security threat enables proactive protection of the vulnerable endpoints. Furthermore, detecting endpoints that are vulnerable to a security threat enables tailored protection operations that are limited to protecting vulnerable endpoints without necessarily also expending resources to protect invulnerable endpoints. Historic vulnerability data is used to group endpoints into cohorts that share similar histories of security infections and compromises. When an active security compromise is discovered at an affected endpoint, cohort protection operations can be applied to protect endpoints in the same cohort as the affected endpoint.

20 Claims, 7 Drawing Sheets

(56) References Cited

OTHER PUBLICATIONS

Kenna Security is Part of Cisco, Cisco Systems, Inc., 2023, retrieved Dec. 1, 2023 from <https://www.cisco.com/c/en/us/products/security/kenna-is-part-of-cisco.html>, 5 pages.

Landauer, T. K., and Dumais, S. T. (1997). A solution to Plato's problem: The Latent Semantic Analysis theory of the acquisition, induction, and representation of knowledge. Psychological Review, 104, 211-240.

Singular Value Decomposition, Wikipedia, retrieved Dec. 1, 2023 from <https://en.wikipedia.org/wiki/Singular_value_decomposition>, 16 pages.

Threat Hunting, Cisco Systems, Inc, 2023, retrieved Dec. 1, 2023 from <https://talosintelligence.com/incident_response/hunting>, 6 pages.

Vulnerability Assessment with Cisco Secure Endpoint, Oct. 12, 2023, retrieved Nov. 8, 2023 from <https://help.kennasecurity.com/hc/en-us/articles/15711337274004-Vulnerability-Assessment-with-Cisco-Secure-Endpoint>, 16 pages.

\* cited by examiner

700

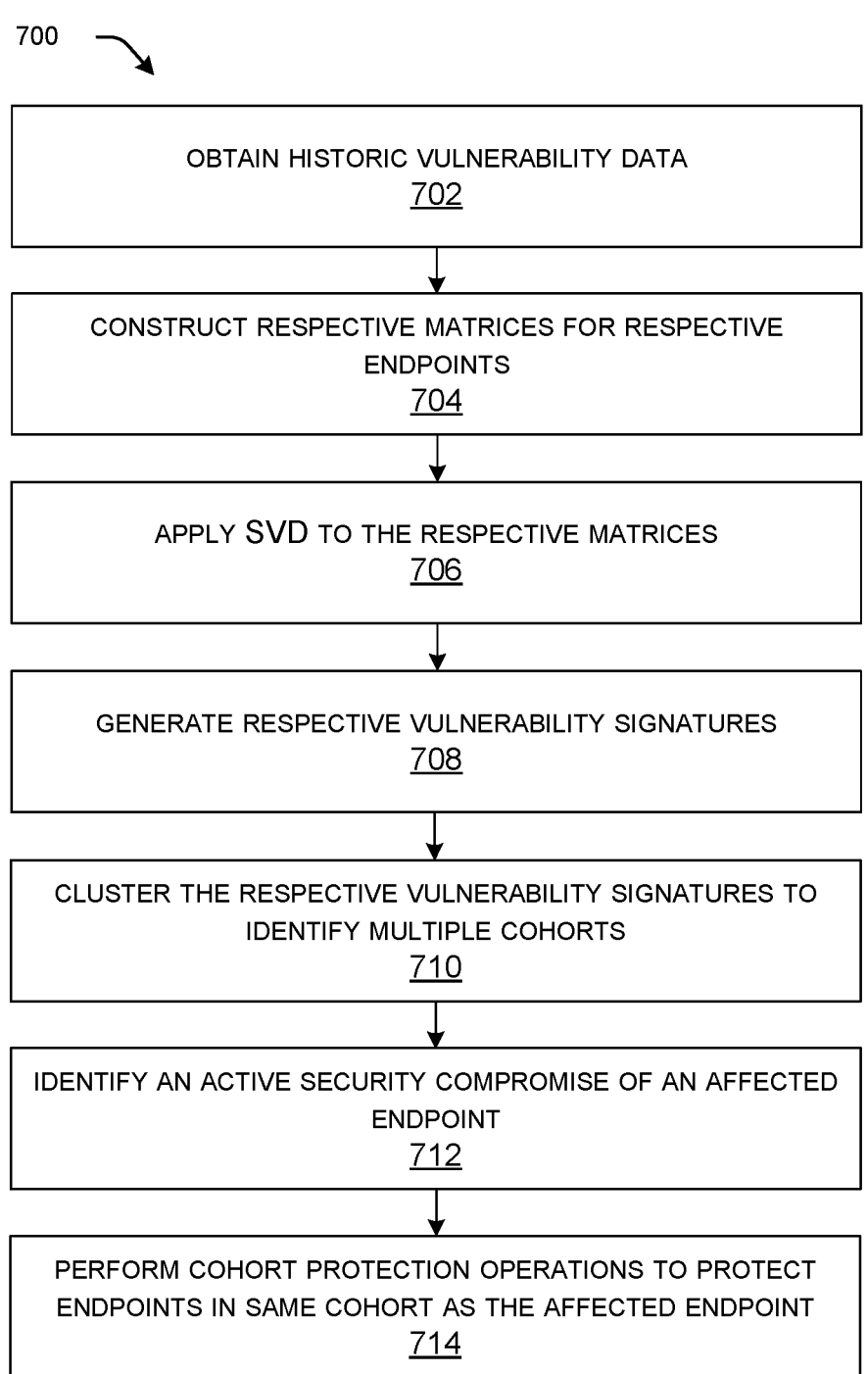

OBTAIN HISTORIC VULNERABILITY DATA
702

CONSTRUCT RESPECTIVE MATRICES FOR RESPECTIVE
ENDPOINTS
704

APPLY SVD TO THE RESPECTIVE MATRICES
706

GENERATE RESPECTIVE VULNERABILITY SIGNATURES
708

CLUSTER THE RESPECTIVE VULNERABILITY SIGNATURES TO
IDENTIFY MULTIPLE COHORTS
710

IDENTIFY AN ACTIVE SECURITY COMPROMISE OF AN AFFECTED
ENDPOINT
712

PERFORM COHORT PROTECTION OPERATIONS TO PROTECT
ENDPOINTS IN SAME COHORT AS THE AFFECTED ENDPOINT
714

FIG. 7

INFERENCE OF VULNERABLE ENDPOINTS TO A SECURITY THREAT

TECHNICAL FIELD

The present disclosure relates generally to network security, and to protecting network endpoints from security compromise in particular.

BACKGROUND

Today's computer networks face an ever-growing number of security threats. Network attack surfaces have grown due to an increasing variety of device types and applications, and the number and variety of security threats has therefore grown as well.

An ongoing arms race exists between attacks and attack detection techniques. More detection is generally perceived as better security, and as a result, detection has become increasingly aggressive. However, increasingly aggressive detection can run the risk of introducing more false positives which can be a drain on valuable security resources.

Responding to security events is often complex and resource intensive. Security appliances deployed in a network and their associated policies can vary greatly. Making sense of different security events and then acting on such events is often tedious and requires deep knowledge and experience.

As a result, companies may begin to ignore security events or tune down detection sensitivity thresholds in order to save resources. Security can become compromised as proper event response becomes unaffordable, sometimes resulting in a waste of money invested in detection.

Meanwhile, not all network devices or other endpoints are in fact vulnerable to all security threats. For example, some endpoints may be behind effective firewalls or may be equipped with powerful security features, while other endpoints may not have similar protections. Techniques are needed to make responding to security events more efficient and effective in part by efficiently and effectively determining which endpoints are vulnerable to a security threat, and conversely which endpoints are not vulnerable.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 is a flow diagram that illustrates an example method performed in connection with inference of vulnerable endpoints to a security threat, in accordance with various aspects of the technologies disclosed herein.

DESCRIPTION OF EXAMPLE EMBODIMENTS

Overview

Figure 1:
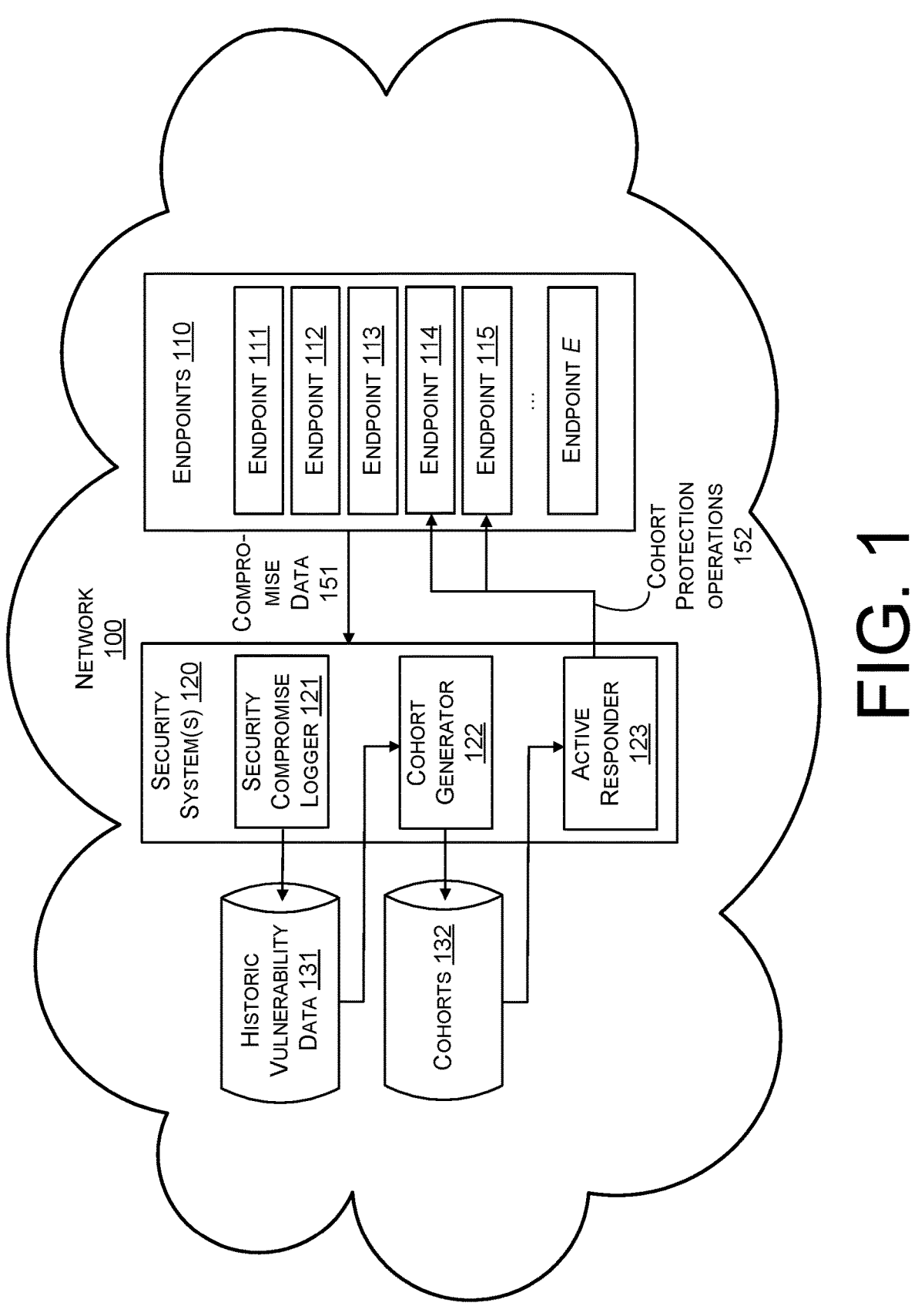
FIG. 1 illustrates an example network comprising endpoints and security systems adapted for inference of vulnerable endpoints to a security threat, in accordance with various aspects of the technologies disclosed herein.

This disclosure describes techniques that can be performed in connection with inference of vulnerable endpoints to a security threat. According to an example embodiment, a method can be performed by a computing device such as a server in a network, wherein the network may also include multiple endpoints. The method can include obtaining historic vulnerability data that indicates whether each of multiple endpoints have previously been infected by each of multiple historic security compromises. The historic security compromises can comprise, e.g., infection by a particular malware or virus.

The method can furthermore include generating, based on the historic vulnerability data, respective vulnerability signatures for respective endpoints of the multiple endpoints. The vulnerability signatures can comprise, e.g., vulnerability vectors which are produced using the techniques described herein.

After generating the vulnerability signatures, the method can cluster the respective vulnerability signatures according to similarity of the respective vulnerability signatures. The resulting clusters identify multiple cohorts, and each cohort of the multiple cohorts can comprise a group of the multiple endpoints.

The cohorts can be used to infer vulnerable endpoints to a security threat. For example, upon identification of an active security compromise, an affected endpoint can be identified which has been compromised or otherwise affected by the active security compromise. The other endpoints in the same cohort as the affected endpoint can then be considered vulnerable, and so in response to identifying the active security compromise, one or more cohort protection operations can optionally be performed to protect the endpoints in the same cohort as the affected endpoint.

The techniques described herein may be performed by one or more computing devices comprising one or more processors and one or more computer-readable media storing computer-executable instructions that, when executed by the one or more processors, cause the one or more processors to perform the methods disclosed herein. The techniques described herein may also be accomplished using non-transitory computer-readable media storing computer-executable instructions that, when executed by one or more processors, perform the methods carried out by the network controller device.

EXAMPLE EMBODIMENTS

Techniques described herein can efficiently detect network endpoints that are vulnerable to individual security threats. New security threats are constantly emerging. Identifying endpoints that are vulnerable to a security threat enables proactive protection of the vulnerable endpoints. Furthermore, detecting endpoints that are vulnerable to a security threat enables tailored protection operations that are limited to protecting vulnerable endpoints without necessarily also expending resources to protect invulnerable endpoints. Historic vulnerability data is used to group endpoints into cohorts that share similar histories of security infections and compromises. When an active security compromise is discovered at an affected endpoint, cohort protection operations can be applied to protect endpoints in the same cohort as the affected endpoint.

In an example, the disclosed techniques can comprise inferring "vulnerability vectors," also referred to herein as vulnerability signatures, of endpoints based on historical infections or other security compromises of the endpoints. Inferring the vulnerability vectors can be accomplished using latent semantic analysis in some implementations.

The vulnerability vectors can be used to identify security "cohorts" or groups/clusters of endpoints. The cohorts can comprise endpoints that are clustered according to their vulnerability vectors, such that endpoints in the same cohort have similar vulnerability vectors. Various clustering/grouping techniques can optionally be used to identify the cohorts.

The cohorts can then be used in connection with proactive responses to emerging security threats. Security technologies can track active compromises of endpoints in a network. When an active compromise is discovered, the affected endpoint can be addressed/secured, and protective operations can be applied to other endpoints in a same cohort as the affected endpoint. The protective operations can include, e.g., sending early warnings/alerts, applying software patches, blocking network ports, and other operations to protect to the other endpoints in the same cohort. The protective operations can be applied even though the other endpoints may not yet have been infected by the active compromise.

Endpoints outside the same cohort of the affected endpoint can, but need not necessarily, also be protected from the threat that triggered the active compromise. In some circumstances, protective operations can be prioritized for the other endpoints in the same cohort as the affected endpoint, e.g., by performing protective operations on the same cohort first, followed by protective operations for endpoints outside the same cohort. In other circumstances, protective operations need not be performed for endpoints outside the same cohort, e.g., when the endpoints outside the same cohort are not deemed vulnerable to the threat that triggered the active compromise. Therefore, in some cases the techniques according to this disclosure can be used to limit the number of endpoints subject to protective operations, thereby conserving limited resources available for network security.

Furthermore, in some embodiments, vulnerability vectors can be compared across cohorts, and risk scores can be assigned to other cohorts (other than the cohort of the affected endpoint), as well as optionally assigning risk scores to endpoints in such other cohorts based on comparison outputs. For example, the more similar the other cohorts' signatures or vulnerability vectors, the higher the assigned risk score can be. Priorities proactive protection can be assigned based on risk scores when additional resources are available for such operations. This is useful in scenarios in which resources are available to act on more than just the endpoints in the same cohort, without necessarily using resources to address entire populations of endpoints.

Each step of the process described above can be implemented according to a variety of different technical design choices. Example technical details are provided herein, understanding that this disclosure is not necessarily limited to the technical details provided herein.

In an example implementation, a vulnerability vector of an endpoint can comprise a vector of float numbers which describe both vulnerabilities of the endpoint and a security environment such as an operating system (OS), firewall, or other data associated with the endpoint. Latent semantic analysis can be applied to infer vulnerability vectors of endpoints based on their historical infections/compromises.

The latent semantic analysis can include, e.g., constructing, for each endpoint, an endpoint-compromise binary indicator matrix A. Using malware infection as an example security compromise, an example endpoint-malware binary indicator matrix A is illustrated below:

$$A = \begin{bmatrix} a_{11} & a_{12} & a_{13} & \cdots & a_{1m} \\ a_{21} & a_{22} & a_{23} & \cdots & a_{2m} \\ \vdots & \vdots & \vdots & \ddots & \vdots \\ a_{n1} & a_{n2} & a_{n3} & \cdots & a_{nm} \end{bmatrix}.$$

where:

$$A_{ij} = \begin{cases} 1, & \text{if endpoint } i \text{ got infected by malware } j \text{ in historical data} \\ 0, & \text{otherwise} \end{cases},$$

and:
    n is the number of endpoints;
    m is the number of malwares.

After endpoint-compromise binary indicator matrices are constructed for each endpoint, the latent semantic analysis can proceed to apply a singular value decomposition (SVD) technique to find low-rank approximations of each matrix A:

$$A_{[n,m]} = U_{[n,r]} \sum\nolimits_{[r,r]} V_{[m,r]}^{T},$$

where:

$$r < n \text{ and } r < m$$

and:
    $\Sigma$ is a diagonal matrix.

After applying SVD, vulnerability vectors of endpoints can be computed using the below example formula:

$$X_{[n,r]} = U_{[n,r]} \sum\nolimits_{[r,r]}$$

Each row calculated using the above calculation can be a vector of length r, and these vectors represent the obtained vulnerabilities of endpoints.

With regard to identification of security cohorts, example embodiments can apply a clustering technique to partition endpoints into clusters according to their vulnerability vectors such that endpoints in the same cluster have similar vulnerability vectors. Each cluster becomes a security cohort which comprises a group of endpoints having similar vulnerabilities and security setups.

Some examples can apply a K-means clustering technique. The number of clusters can be set as a large number, for example around fifty (50), so that endpoints within each cohort tend to have more consistent vulnerabilities and security setups.

After security cohorts are identified, the cohorts can be used in connection with proactive endpoint protection operations as described herein. Existing network security technologies include a variety of tools to protect network endpoints, some of which are fully automated and some of which support human analysts. Such tools can be modified to make use of security cohorts identified according to this disclosure.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example network comprising endpoints and security systems adapted for inference of vulnerable endpoints to a security threat, in accordance with various aspects of the technologies disclosed herein. FIG. 1 includes example network 100. The network 100 comprises endpoints 110, security system(s) 120, historic vulnerability data 131, and cohorts 132.

The endpoints 110 include example endpoints 111, 112, 113, 114, 115, . . . , E. Today's networks may include tens, hundreds, and even thousands of endpoints. The security system(s) 120 include security compromise logger 121, cohort generator 122, and active responder 123. Example aspects of the security compromise logger 121, cohort generator 122, and active responder 123 are described further with reference to FIG. 2.

In an example according to FIG. 1, over time the endpoints 110 can be exposed to various threats such as malware, viruses, and other security compromises. Some of the endpoints 110 may be infected by a first example malware, while others of the endpoints 110 may be infected by a second example malware. These infections may occur over the course of days, weeks, months or years. The security system(s) 120 can be configured to detect and/or respond to such security compromises using any of multiple available tools and techniques.

The security system(s) 120 can furthermore be configured to collect compromise data 151 which can include, e.g., malware or other compromise identification information, and identifications of those endpoints (among endpoints 110) which were affected/infected by each malware or other security compromise. The security compromise logger 121 can be configured to store historic vulnerability data 131 which can include, e.g., a list of the malware or other security compromises which infected/affected each endpoint among endpoints 110.

Depending on endpoint configuration and network environment, any given endpoint among the endpoints 110 may be more vulnerable to some threats than to others. However, determining endpoint vulnerabilities to future threats based on endpoint configurations and endpoint network environments is complex and may involve deep security expertise. Therefore, rather than attempting to determine endpoint vulnerabilities based purely on analysis of endpoint configurations and network environments, embodiments of this disclosure can instead use a security compromise logger 121 to log historic vulnerability data 131 and then infer, through the use of the cohort generator 122 and the active responder 123, that groups of endpoints having similar vulnerabilities in the past may likely also exhibit similar vulnerabilities to future threats.

The cohort generator 122 can be configured to identify groups of endpoints 110, referred to herein as cohorts, which exhibit similar vulnerability patterns in the historic vulnerability data 131. Identified cohorts can be stored in cohorts 132. Each cohort among the cohorts 132 can comprise, e.g., a list of endpoints which is included in the cohort. In some embodiments, every endpoint among endpoints 110 can be included in one and only one cohort. In other embodiments, one or more endpoints among endpoints 110 can optionally be included in multiple different cohorts. Furthermore, some embodiments may require each endpoint to be included in at least one cohort, while other embodiments may allow some endpoints to not be included in any cohorts.

Figure 2:
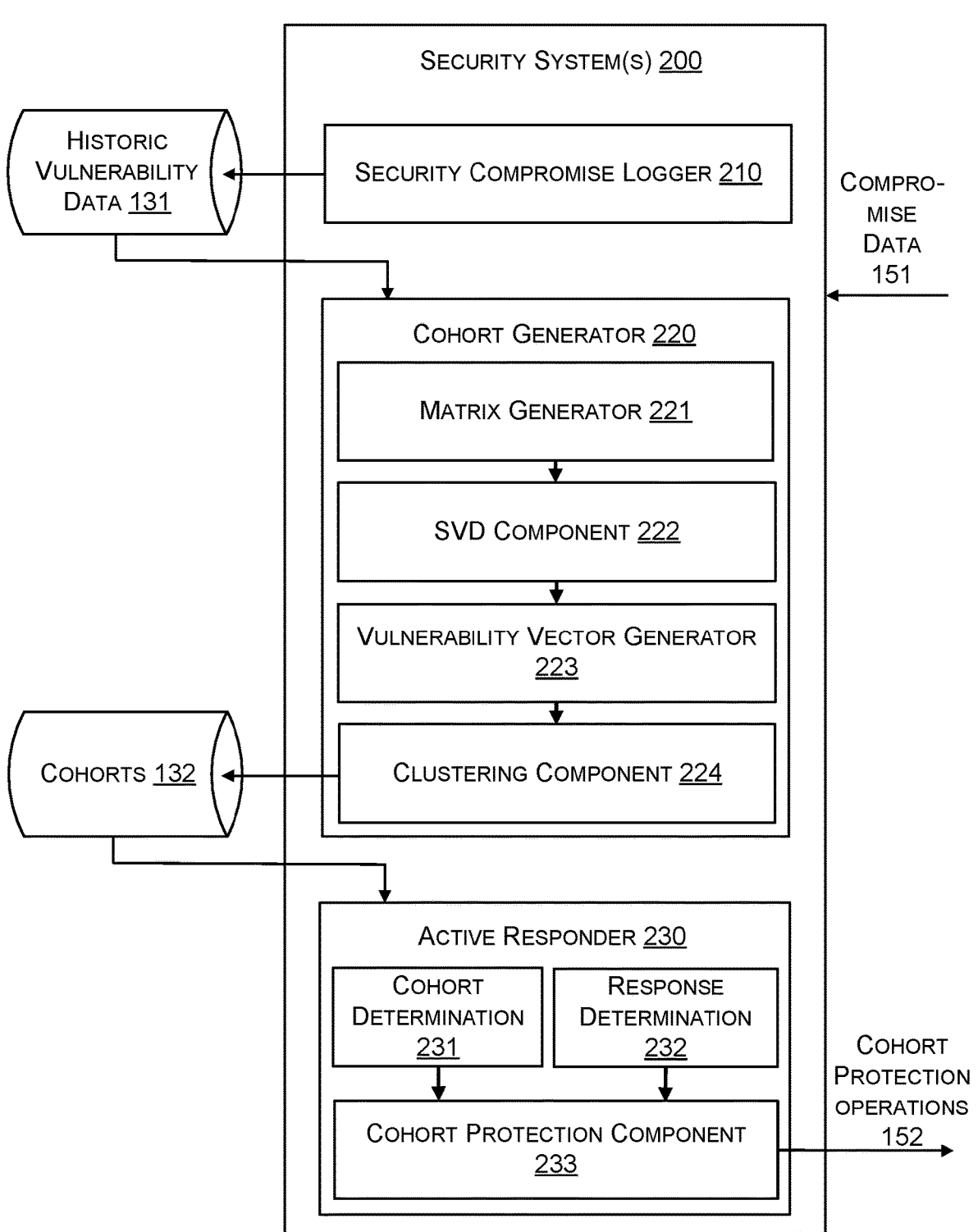
FIG. 2 illustrates example security systems which can implement the security systems introduced in FIG. 1, in accordance with various aspects of the technologies disclosed herein.

In order identify cohorts, the cohort generator 122 can optionally be configured to use the historic vulnerability data 131 to generate a vulnerability vector or vulnerability signature for each endpoint among the endpoints 110. The cohort generator 122 can then group similar vulnerability vectors, e.g., using a clustering technique or other similarity comparison technique. The vulnerability vectors in each resulting group can be mapped back to their associated endpoints, and endpoint identifiers associated with a group can be stored as a cohort among the cohorts 132. FIG. 2 includes further example aspects of the cohort generator 122.

The active responder 123 can be configured to use the cohorts 132 to supplement security system(s) 120 responses to security compromises. In an example, endpoints 113, 114, and 115 may be included in a cohort. Compromise data 151 may indicate that endpoint 113 was recently compromised by a virus V. Security system(s) 120 may be configured to take action to address the compromise of endpoint 113. Additionally, the active responder 123 can identify, from cohorts 132, that endpoints 114 and 115 are in a same cohort as the affected endpoint 113. The active responder 123 can be configured to perform cohort protection operations 152 to proactively protect endpoints 114 and 115 from the virus V. The cohort protection operations 152 can include generating a security team alert or warning, installing a software patch or virus definition, or changing a network 100 configuration such as blocking a port or updating a firewall applicable to endpoints 114 and 115.

FIG. 2 illustrates example security systems which can implement the security systems introduced in FIG. 1, in accordance with various aspects of the technologies disclosed herein. More particularly, the example security system(s) 200 can implement the security system(s) 120 in some embodiments. The security system(s) 200 include a security compromise logger 210, a cohort generator 220, and an active responder 230. The cohort generator 220 comprises a matrix generator 221, an SVD component 222, a vulnerability vector generator 223, and a clustering component 224. The active responder 230 comprises cohort determination 231, response determination 232, and cohort protection component 233. FIG. 2 furthermore illustrates the historic vulnerability data 131, the cohorts 132, the compromise data 151 and the cohort protection operations 152 introduced in FIG. 1.

In an example according to FIG. 2, the security compromise logger 210 can be configured to store historic vulnerability data 131 which can include, e.g., a list of the malware or other security compromises which infected/affected each endpoint in a network, as described with reference to the security compromise logger 121 illustrated in FIG. 1. The cohort generator 220 can then generate cohorts 132 based on the historic vulnerability data 131. The cohort generator 220 can apply the matrix generator 221, SVD component 222, vulnerability vector generator 223, and clustering component 224 to generate the cohorts 132.

The cohort generator 220 can apply a latent semantic analysis to infer vulnerability vectors of endpoints based on their historic vulnerability data 131. The cohort generator 220 can use the matrix generator 221, SVD component 222, and vulnerability vector generator 223 in the latent semantic analysis in order to generate vulnerability vectors for endpoints. Example resulting vulnerability vectors can comprise float numbers which describe both vulnerabilities of the endpoint and a security environment such as an operating system (OS), firewall, or other data associated with the endpoint.

The matrix generator 221 can be configured to construct, for each endpoint, an endpoint-compromise binary indicator matrix A. For example, the matrix generator 221 can generate an endpoint-malware binary indicator matrix A, such as illustrated below, for each endpoint:

$$A = \begin{bmatrix} a_{11} & a_{12} & a_{13} & \ldots & a_{1m} \\ a_{21} & a_{22} & a_{23} & \ldots & a_{2m} \\ \vdots & \vdots & \vdots & \ddots & \vdots \\ a_{n1} & a_{n2} & a_{n3} & \ldots & a_{nm} \end{bmatrix}.$$

where;

$$A_{ij} = \begin{cases} 1, & \text{if endpoint } i \text{ got infected by malware } j \text{ in historical data} \\ 0, & \text{otherwise} \end{cases},$$

and:
n is the number of endpoints;
m is the number of malwares.

SVD component 222 can be configured to apply a singular value decomposition (SVD) technique to find low-rank approximations of each matrix A, output from the matrix generator 221. For example, the SVD component 222 can be configured to perform the below calculation for each matrix A:

$$A_{[n,m]} = U_{[n,r]} \sum\nolimits_{[r,r]} V^{\top}_{[m,r]},$$

where:

$$r < n \text{ and } r < m$$

and:
Σ is a diagonal matrix.
The vulnerability vector generator 223 can be configured to use the outputs of the SVD component 222 to compute vulnerability vectors of each endpoint. The vulnerability vector generator 223 can apply the below example formula:

$$X_{[n,r]} = U_{[n,r]} \sum\nolimits_{[r,r]}$$

The outputs of the vulnerability vector generator 223 can comprise rows representing vulnerability vectors of endpoints. Each row calculated using the above calculation can be a vector of length r, and these vectors represent the obtained vulnerabilities of endpoints. The vulnerability vectors can be provided as an input to the clustering component 224 to enable the clustering component to generate the cohorts 132 based on the vulnerability vectors.

The clustering component 224 can be configured to apply a clustering or other grouping technique to the outputs of the vulnerability vector generator 223, e.g., to vulnerability vectors or other vulnerability signatures, to partition endpoints into clusters/cohorts 132 such that vulnerability vectors, and their corresponding endpoints, in a same cohort of the cohorts 132 have similar vulnerability vectors. Each cohort of the cohorts 132 can comprise a group of endpoints having similar vulnerabilities and, optionally, similar security setups. In general, the vulnerability vectors in a given cohort can have greater similarity to one another than to the vulnerability vectors in a different cohort.

A variety of clustering techniques are available and can be adapted for use along with embodiments of this disclosure. One example clustering technique is a K-means clustering technique. K-means clustering is a centroid-based clustering technique that organizes data into non-hierarchical clusters. Centroid-based clustering techniques such as K-means are generally efficient and sensitive to initial conditions and outliers.

Further example clustering techniques include density-based clustering techniques. Density-based clustering techniques can connect areas of high example density into clusters. Density-based clustering techniques do not assign outliers to clusters; however, outliers can optionally be assigned to clusters after an initial clustering operation.

Distribution-based clustering techniques are also available. Distribution-based clustering techniques can cluster data into multiple different data distributions. As distance from a distribution's center increases, the probability that a point belongs to the distribution decreases.

The above example clustering techniques are intended to illustrate example techniques which can be used in some implementations. Other clustering techniques, and other similarity-based grouping techniques, can be applied. Embodiments of this disclosure need not be limited to the use of any particular clustering or grouping technique.

The active responder 230 can be configured to use the security cohorts 132 to conduct proactive endpoint protection operations. Active responder 230 operations can optionally supplement other security operations implemented by the security system(s) 200. In the illustrated implementation, the active responder 230 includes cluster determination 231, response determination 232, and cohort protection component 233.

Example operations of the active responder 230 can include, e.g., receiving compromise data 151 that identifies an active security compromise applicable to one or more endpoints. In response to receiving the compromise data 151, the active responder 230 can be configured to use cohort determination 231 to determine cohort(s) among the cohorts 132 which include the endpoint(s) identified in the active security compromise. The determined cohort(s) may include multiple other endpoints which were not necessarily compromised, but which were in a same cohort as a compromised endpoint.

Example operations of the active responder 230 can further include, e.g., providing the compromise data 151 as an input to response determination 232, wherein response determination 232 is configured to determine, based on the compromise data 151, one or more cohort protection operations to protect endpoints in a same cohort as a compromised or otherwise affected endpoint. Cohort protection operations can include, e.g., generating alerts for managers of the endpoints in the same cohort, or installing a security patch or antivirus definition at the endpoints in the same cohort, or performing network reconfigurations, such as firewall or port reconfigurations, to protect the endpoints in the same cohort. This disclosure is not limited to any particular protection operations. The protection operations can suit the nature of the compromise identified in the compromise data 151.

The cohort protection component 233 can be configured to conduct cohort protection operations 152, wherein the cohort protection operations 152 were determined by response determination 232, on endpoints in a same cohort as a compromised or otherwise affected endpoint, as determined by cohort protection component 233. Therefore, the cohort protection component 233 can use inputs comprising endpoint identifications from cohort determination 231 and cohort protection operations from response determination 232, and the cohort protection component 233 can be configured to perform cohort protection operations 152 comprising the application of the outputs from response determination 232 to the endpoints identified by cohort determination 231.

Figure 3:
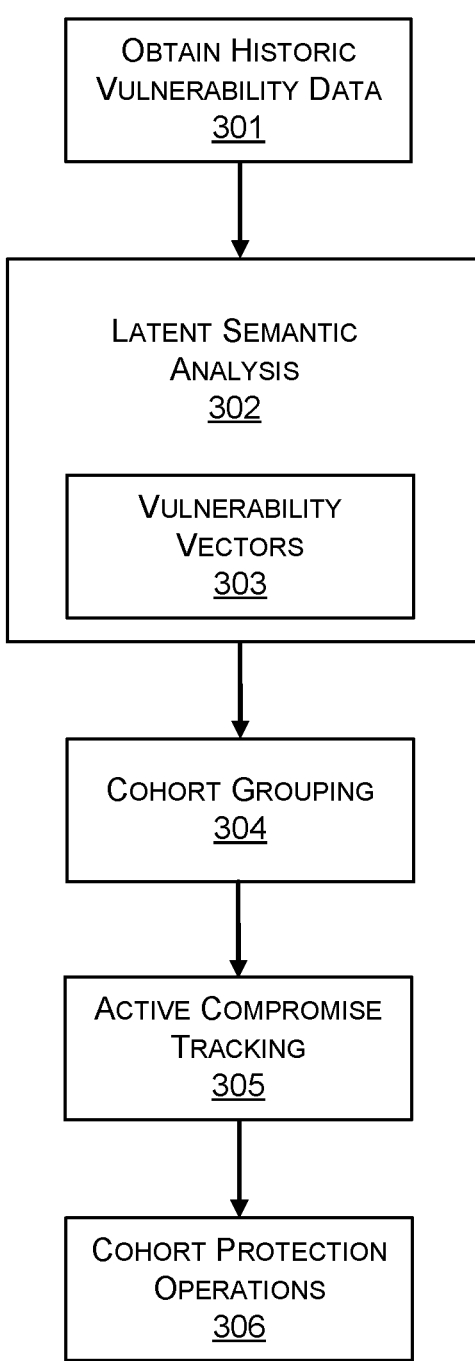
FIG. 3 is a flow diagram that illustrates an example method which can be carried out by security systems introduced in FIG. 1 and FIG. 2, in accordance with various aspects of the technologies disclosed herein.

FIG. 3 is a flow diagram that illustrates an example method which can be carried out by security systems introduced in FIG. 1 and FIG. 2, in accordance with various aspects of the technologies disclosed herein. FIG. 3 includes obtain historic vulnerability data 301, latent semantic analysis 302, cohort grouping 304, active compromise tracking 305, and cohort protection operations 306. The latent semantic analysis 302 can generate vulnerability vectors 303.

At obtain historic vulnerability data 301, in some embodiments, each time an endpoint in a network is compromised, a security compromise logger 210 can log a compromise identifier, such as a malware or virus identifier, and an endpoint identifier of the compromised endpoint in a database such as historic vulnerability data 131. In some embodiments, the compromise identifier can comprise a hash of a malware or virus code. In other embodiments, the compromise identifier can comprise an industry-standard identification retrieved from a public database of security compromises.

At latent semantic analysis 302, one or more subcomponents of a cohort generator 220 can be configured to perform a latent semantic analysis technique to the historic vulnerabilities of each endpoint, as stored in the historic vulnerability data 131. The latent semantic analysis 302 can produce vulnerability vectors 303 as an output, wherein vulnerability vectors 303 comprises a vulnerability vector associated with each analyzed endpoint.

In general, latent semantic analysis techniques can use natural language processing to analyze relationships between data sets and can produce a set of outputs related to the data sets. Latent semantic analysis can construct matrices containing malware/compromise counts per endpoint, and SVD can be used to reduce the number of rows in the matrices while preserving the similarity structure among columns. Resulting matrices can then be compared, e.g., by cosine similarity between any two columns.

At cohort grouping 304, the vulnerability vectors 303 can be grouped according to similarity of the vulnerability vectors 303, so that vulnerability vectors 303 in a given group are more similar to other vulnerability vectors in the given group than they are to vulnerability vectors in other groups. After groups of vulnerability vectors are determined, cohort grouping 304 can construct cohorts by placing endpoint identifiers corresponding to a group of vulnerability vectors into a cohort data structure, e.g., a cohort list of endpoint identifiers.

At active compromise tracking, security system(s) 200 can track/detect security compromises pursuant to any desired security techniques. Different security system(s) 200 can use different techniques to monitor a network for security compromises and any available techniques can be used in connection with embodiments of this disclosure. Security system(s) 200 can be modified in accordance with this disclosure to notify an active responder 230 by supplying an endpoint identifier and compromise information to the active responder 230 in response to identifying an active compromise, so that the active responder 230 can proactively perform cohort protection operations.

At active compromise tracking, security system(s) 200 can track/detect security compromises pursuant to any desired security techniques. Different security system(s) 200 can use different techniques to monitor a network for security compromises and any available techniques can be used in connection with embodiments of this disclosure. Security system(s) 200 can be modified in accordance with this disclosure to notify an active responder 230 by supplying an endpoint identifier and compromise information to the active responder 230 in response to identifying an active compromise, so that the active responder 230 can proactively perform cohort protection operations 306. Cohort protection operations 306 can comprise, e.g., any of the cohort protection operations 152 described with reference to FIG. 2.

Figure 4:
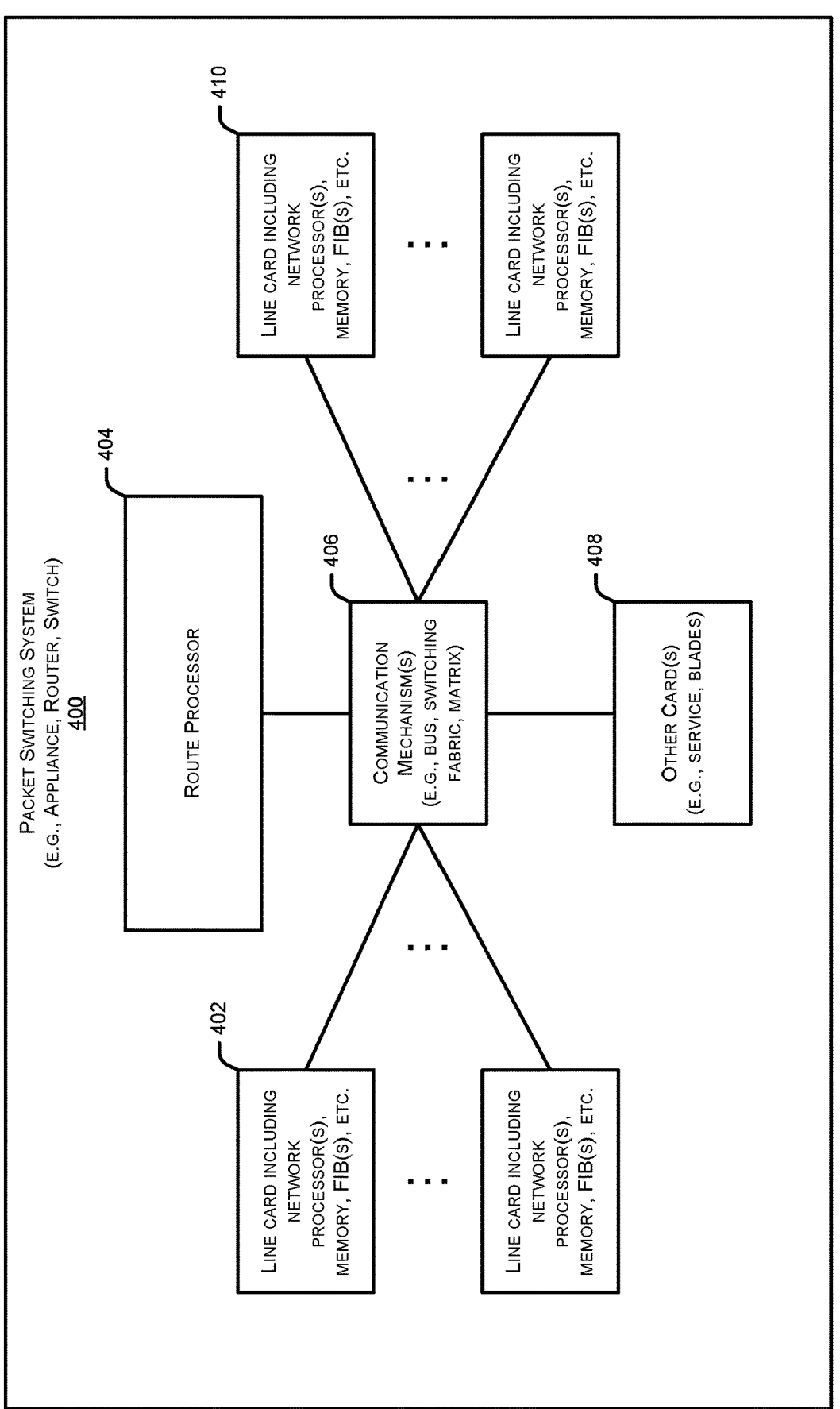
FIG. 4 illustrates a packet switching system as one example of an endpoint device, in accordance with various aspects of the technologies disclosed herein.

FIG. 4 illustrates a packet switching system as one example of an endpoint device, in accordance with various aspects of the technologies disclosed herein. In some examples, the packet switching system 400 can be implemented as one or more packet switching device(s). The packet switching system 400 may be deployed in a network, for example, the packet switching system 400 can implement and endpoint in the network 100 illustrated in FIG. 1.

In some examples, the packet switching system 400 may comprise multiple line card(s) 402, 410, each with one or more network interfaces for sending and receiving packets over communications links (e.g., possibly part of a link aggregation group). The packet switching system 400 may also have a control plane with one or more processing elements, e.g., the route processor 404 for managing the control plane and/or control plane processing of packets associated with forwarding of packets in a network. The packet switching system 400 may also include other cards 408 (e.g., service cards, blades) which include processing elements that are used to process (e.g., forward/send, drop, manipulate, change, modify, receive, create, duplicate, apply a service) packets associated with forwarding of packets in a network.

The packet switching system 400 may comprise a communication mechanism 406 (e.g., bus, switching fabric, and/or matrix, etc.) for allowing the different entities such as the multiple line card(s) 402, 410, the route processor 404, and the other cards 408 to communicate. The communication mechanism 406 can optionally be hardware-based. Line card(s) 402, 410 may perform the actions of being both an ingress and/or an egress line card of the line card(s) 402, 410, with regard to multiple packets and/or packet streams being received by, or sent from, the packet switching system 400.

Figure 5:
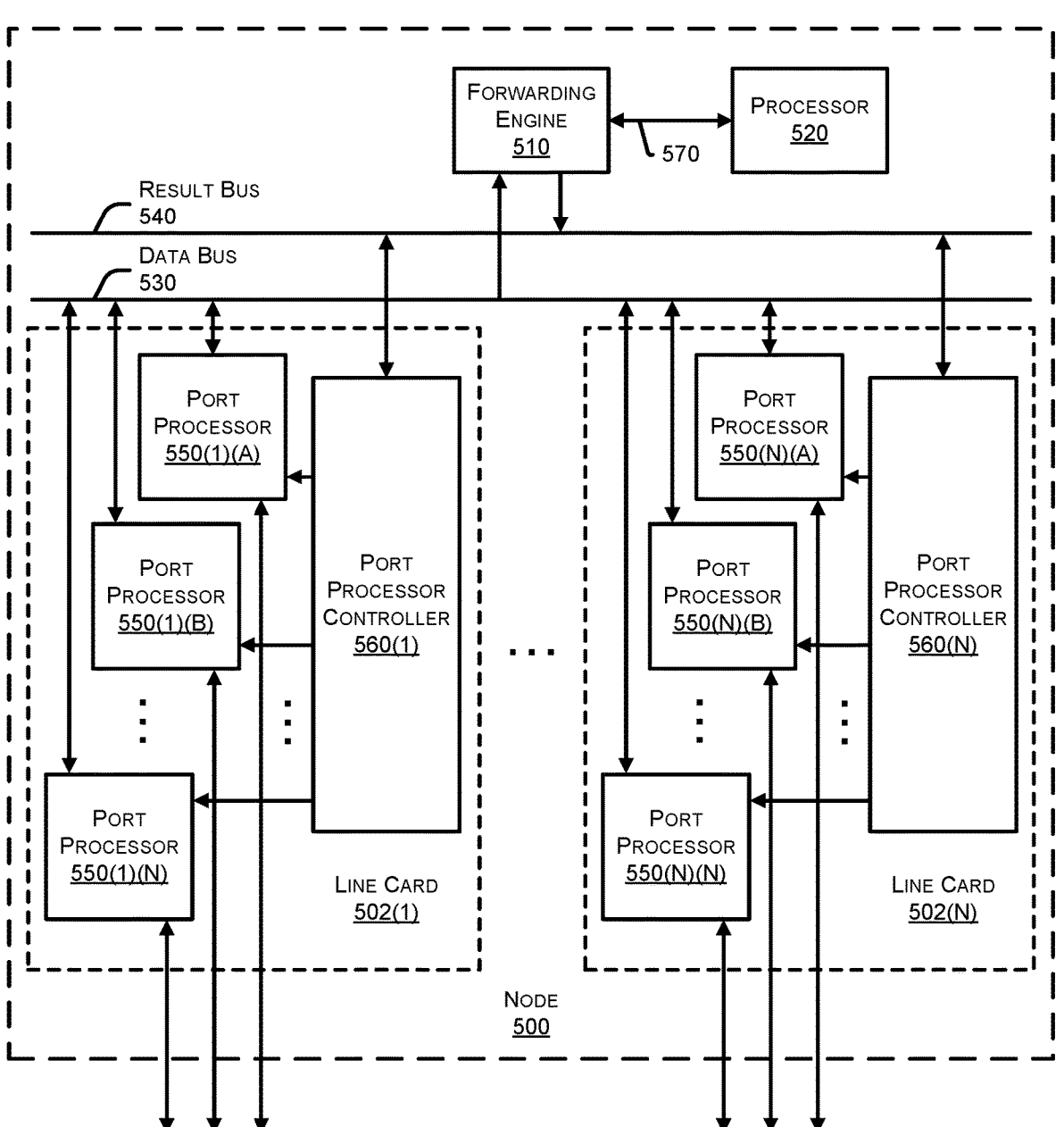
FIG. 5 illustrates a node as another example of an endpoint device, in accordance with various aspects of the technologies disclosed herein.

FIG. 5 illustrates a node as another example of an endpoint device, in accordance with various aspects of the technologies disclosed herein. In some examples, node 500 may include any number of line cards 502, e.g., line cards 502(1)-(N), where N may be any integer greater than 1, and wherein the line cards 502 are communicatively coupled to a forwarding engine 510 (also referred to as a packet forwarder) and/or a processor 520 via a data bus 530 and/or a result bus 540.

Line cards 502 may include any number of port processors 550, for example, line card 502(1) comprises port processors 550(1)(A)-550(1)(N), and line card 502(N) comprises port processors 550(N)(A)-550(N)(N). The port processors 550 can be controlled by port processor controllers 560, e.g., port processor controllers 560(1), 560(N), respectively.

Additionally, or alternatively, the forwarding engine 510 and/or the processor 520 can be coupled to one another via the data bus 530 and the result bus 540 and may also be communicatively coupled to one another by a communications link 570. The processors (e.g., the port processor(s) 550 and/or the port processor controller(s) 560) of each line card 502 may optionally be mounted on a single printed circuit board.

When a packet or packet and header are received, the packet or packet and header may be identified and analyzed by the node 500 in the following manner. Upon receipt, a packet (or some or all of its control information) or packet and header may be sent from one of port processor(s) 550 at which the packet or packet and header was received and to one or more of those devices coupled to the data bus 530 (e.g., others of the port processor(s) 550, the forwarding engine 510 and/or the processor 520). Handling of the packet or packet and header may be determined, for example, by the forwarding engine 510.

For example, the forwarding engine 510 may determine that the packet or packet and header should be forwarded to one or more of the other port processors 550. This may be accomplished by indicating to corresponding one(s) of port processor controllers 560 that a copy of the packet or packet and header held in the given one(s) of port processor(s) 550 should be forwarded to the appropriate other one of port processor(s) 550. Additionally, or alternatively, once a packet or packet and header has been identified for processing, the forwarding engine 510, the processor 520, and/or the like may be used to process the packet or packet and header in some manner and/or may add packet security information in order to secure the packet.

On a node 500 sourcing a packet or packet and header, processing may include, for example, encryption of some or all of the packet or packet and header information, the addition of a digital signature, and/or some other information and/or processing capable of securing the packet or packet and header. On a node 500 receiving a packet or packet and header, the processing may be performed to recover or validate the packet or packet and header information that has been secured.

Figure 6:
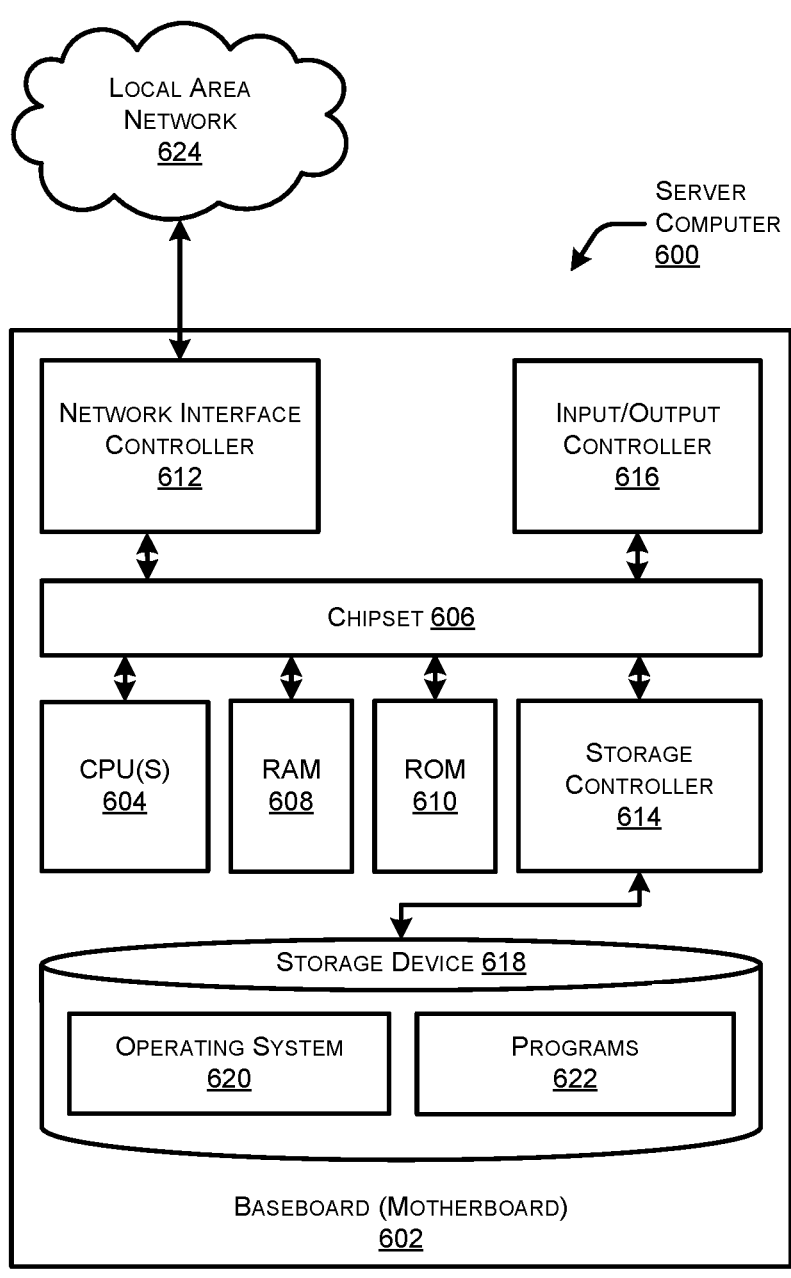
FIG. 6 illustrates an example computer hardware architecture that can implement the security systems and methods disclosed herein, in accordance with various aspects of the technologies disclosed herein.

FIG. 6 illustrates an example computer hardware architecture that can implement an endpoint and/or the security systems and methods disclosed herein, in accordance with various aspects of the technologies disclosed herein. For example, the illustrated server computer 600, optionally operating in cooperation with other server computers, can implement some or all of the security system(s) 120 introduced in FIG. 1 or the security system(s) 200 introduced in FIG. 2. The computer architecture shown in FIG. 6 illustrates a conventional server computer 600, however the computer architecture can optionally implement any other computing devices such as a router, a workstation, desktop computer, laptop, tablet, network appliance, e-reader, smartphone, or other computing device. The illustrated computer architecture can be utilized to execute any of the software components presented herein.

The server computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the server computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the server computer 600. The chipset 606 can further provide an interface to a computer-readable storage medium such as a read-only memory ("ROM") 610 or non-volatile RAM ("NVRAM") for storing basic routines that help to startup the server computer 600 and to transfer information between the various components and devices. The ROM 610 or NVRAM can also store other software components necessary for the operation of the server computer 600 in accordance with the configurations described herein.

The server computer 600 can operate in a networked environment using logical connections to remote computing devices and computer systems through a network, such as the LAN 624. The chipset 606 can include functionality for providing network connectivity through a NIC 612, such as a gigabit Ethernet adapter. The NIC 612 is capable of connecting the server computer 600 to other computing devices over the LAN 624. It should be appreciated that multiple NICs 612 can be present in the server computer 600, connecting the computer to other types of networks and remote computer systems.

The server computer 600 can be connected to a storage device 618 that provides non-volatile storage for the server computer 600. The storage device 618 can store an operating system 620, programs 622, and data, to implement any of the various components described in detail herein.

The storage device 618 can be connected to the server computer 600 through a storage controller 614 connected to the chipset 606. The storage device 618 can comprise one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the server computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 600 can further read information from the storage device 618 by detecting the physical states or characteristics of one or more particular locations within the physical storage units.

In addition to the mass storage device 618 described above, the server computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 600. In some examples, the operations performed by the security system(s) illustrated in FIGS. 1-2, and or any components included therein, may be supported by one or more devices similar to server computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the server computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the server computer 600.

In one embodiment, the storage device 618 or other computer-readable storage media is encoded with computer-executable instructions which, when loaded into the server computer 600, transform the computer from a general-purpose computing system into a special-purpose computer capable of implementing the embodiments described herein. These computer-executable instructions transform the server computer 600 by specifying how the CPUs 604 transition between states, as described above.

According to one embodiment, the server computer 600 has access to computer-readable storage media storing computer-executable instructions which, when executed by the server computer 600, perform the various processes described with regard to FIG. 7. The server computer 600 can also include computer-readable storage media having instructions stored thereupon for performing any of the other computer-implemented operations described herein.

The server computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the server computer 600 might not include all of the components shown in FIG. 6, can include other components that are not explicitly shown in FIG. 6, or might utilize an architecture completely different than that shown in FIG. 6.

FIG. 7 is a flow diagram of an example method 700 performed at least partly by a computing device that implements a security system according to this disclosure, such as the server computer 600. The logical operations described herein with respect to FIG. 7 may be implemented (1) as a sequence of computer-implemented acts or program modules running on a computing system and/or (2) as interconnected machine logic circuits or circuit modules within the computing system. In some examples, the method 700 may be performed by a system comprising one or more processors and one or more non-transitory computer-readable media storing computer-executable instructions that, when executed by the one or more processors, cause the one or more processors to perform the method 700.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

It should also be appreciated that more or fewer operations might be performed than shown in FIG. 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 is a flow diagram that illustrates an example method performed in connection with inference of vulnerable endpoints to a security threat. The operations illustrated in FIG. 7 can be performed by security system(s), e.g., the security system(s) 120 illustrated in FIG. 1, in some examples. Furthermore, in some examples, the operations illustrated in FIG. 7 can be performed as two independent and asynchronous processes. A first process can cluster endpoints into cohorts and can include operations 702, 704, 706, 708, and 710. A second process can perform actions on cohorts and can include operations 712 and 714. The first process can be executed repeatedly according to a first, lower frequency, e.g., weekly or monthly, and the second process can be executed repeatedly according to a second, higher frequency, e.g., daily, hourly, or otherwise.

At operation 702, the security system(s) 120 can be configured to obtain historic vulnerability data 131 that indicates whether each of multiple endpoints 110 have previously been infected by each of multiple historic security compromises. The security system(s) 120 can optionally construct the historic vulnerability data 131 over time as compromises occur, and operation 702 can be performed in connection with initiating operations of the cohort generator 122 to generate cohorts 132. In some embodiments, the cohort generator 122 can regenerate cohorts 132 periodically (e.g., daily, weekly, monthly or yearly). In other the cohort generator 122 can regenerate cohorts 132 in response to addition of, or reconfiguration of, one or more endpoints 110 in the network 100.

The multiple endpoints 110 can comprise respective devices in a network 100. For example, the multiple endpoints 110 can comprise servers such as the server computer 600 illustrated in FIG. 6, routers, packet switching systems such as packet switching system 400 illustrated in FIG. 4, firewalls, nodes such as node 500 illustrated in FIG. 5, personal computers such as laptops, printers, mobile devices such as mobile telephones, and any other devices configured to connect to the network 100. The multiple historic security compromises which may affect the multiple endpoints 110 can include malware infections, virus infections, or optionally other types of security attacks.

At operations 704, 706, and 708, the security system(s) 120 can be configured to perform a latent semantic analysis process to generate vulnerability signatures for each of the multiple endpoints 110. A vulnerability signature can comprise a vulnerability vector or any other data that characterizes the historic vulnerabilities of an endpoint.

At operation 704, the security system(s) 120 can be configured to construct respective matrices based on the historic vulnerability data 131, wherein each respective matrix of the respective matrices can comprise, e.g., a respective endpoint to historic security compromise binary indicator matrix. At operation 706, the security system(s) 120 can be configured to apply SVD to the respective matrices that are constructed at operation 704. At operation 708, the security system(s) 120 can be configured to generate respective vulnerability signatures for respective endpoints of the multiple endpoints 110.

At operation 710, the security system(s) 120 can be configured to cluster the respective vulnerability signatures generated at operation 708, according to similarity of the respective vulnerability signatures, in order to identify multiple cohorts. Each cohort of the multiple cohorts can comprise one or more endpoints of the multiple endpoints 110. In some implementations, clustering the respective vulnerability signatures according to similarity of the respective vulnerability signatures can comprise applying a k-means clustering technique, as described herein.

At operation 712, the security system(s) 120 can be configured to identify an active security compromise of an affected endpoint among the multiple endpoints 110. For example, the affected endpoint may be endpoint 113, which may be compromised by being infected with a malware M, and which may be in a cohort along with endpoints 114 and 115. At operation 712, the security system(s) 120 can be identify the infection of endpoint 113 by malware M.

At operation 714, the security system(s) 120 can be configured to perform, in response to identifying the active security compromise at operation 712, one or more cohort protection operations to protect endpoints in a same cohort as the affected endpoint. Continuing the example introduced above, the security system(s) 120 can be configured to perform cohort protection operations to protect endpoints 114 and 115 from the malware M, because the endpoints 114 and 115 are in a same cohort as the affected endpoint 113. The one or more cohort protection operations can comprise, e.g., at least one of installing a security patch on the endpoints 114, 115 in the same cohort, generating an alert for the endpoints 114, 115 in the same cohort, or changing a network configuration to protect the endpoints 114, 115 in the same cohort.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:

obtaining historic vulnerability data that indicates whether each of multiple endpoints have previously been infected by each of multiple historic security compromises;

generating, based on the historic vulnerability data, respective vulnerability signatures for respective endpoints of the multiple endpoints;

clustering the respective vulnerability signatures according to similarity of the respective vulnerability signatures in order to identify multiple cohorts, wherein each cohort of the multiple cohorts comprises one or more endpoints of the multiple endpoints;

identifying an active security compromise of an affected endpoint among the multiple endpoints; and performing, in response to identifying the active security compromise, one or more cohort protection operations to protect endpoints in a same cohort as the affected endpoint.

2. The method of claim 1, wherein generating, based on the historic vulnerability data, the respective vulnerability signatures comprises constructing respective matrices based on the historic vulnerability data, wherein each respective matrix of the respective matrices comprises a respective endpoint to historic security compromise binary indicator matrix.

3. The method of claim 2, wherein generating, based on the historic vulnerability data, the respective vulnerability signatures further comprises applying singular value decomposition to the respective matrices.

4. The method of claim 1, wherein one or more of the multiple historic security compromises comprises a malware infection or a virus infection.

5. The method of claim 1, wherein the respective vulnerability signatures comprise respective vulnerability vectors generated using latent semantic analysis of the historic vulnerability data.

6. The method of claim 1, wherein one or more of the respective endpoints comprises a respective device in a network.

7. The method of claim 1, wherein clustering the respective vulnerability signatures according to similarity of the respective vulnerability signatures comprises applying a k-means clustering technique.

8. The method of claim 1, wherein the one or more cohort protection operations comprise at least one of installing a security patch on the endpoints in the same cohort, generating an alert for the endpoints in the same cohort, or changing a network configuration to protect the endpoints in the same cohort.

9. A device comprising:

one or more processors;

one or more non-transitory computer-readable media storing computer-executable instructions that, when executed by the one or more processors, cause the one or more processors to perform operations comprising:

obtaining historic vulnerability data that indicates whether each of multiple endpoints have previously been infected by each of multiple historic security compromises;

generating, based on the historic vulnerability data, respective vulnerability signatures for respective endpoints of the multiple endpoints;

clustering the respective vulnerability signatures according to similarity of the respective vulnerability signatures in order to identify multiple cohorts, wherein each cohort of the multiple cohorts comprises one or more endpoints of the multiple endpoints;

identifying an active security compromise of an affected endpoint among the multiple endpoints; and performing, in response to identifying the active security compromise, one or more cohort protection operations to protect endpoints in a same cohort as the affected endpoint.

10. The device of claim 9, wherein generating, based on the historic vulnerability data, the respective vulnerability signatures comprises constructing respective matrices based on the historic vulnerability data, wherein each respective matrix of the respective matrices comprises a respective endpoint to historic security compromise binary indicator matrix.

11. The device of claim 10, wherein generating, based on the historic vulnerability data, the respective vulnerability signatures further comprises applying singular value decomposition to the respective matrices.

12. The device of claim 9, wherein one or more of the multiple historic security compromises comprises a malware infection or a virus infection.

13. The device of claim 9, wherein the respective vulnerability signatures comprise respective vulnerability vectors generated using latent semantic analysis of the historic vulnerability data.

14. The device of claim 9, wherein one or more of the respective endpoints comprises a respective device in a network.

15. The device of claim 9, wherein clustering the respective vulnerability signatures according to similarity of the respective vulnerability signatures comprises applying a k-means clustering technique.

16. The device of claim 9, wherein the one or more cohort protection operations comprise at least one of installing a security patch on the endpoints in the same cohort, generating an alert for the endpoints in the same cohort, or changing a network configuration to protect the endpoints in the same cohort.

17. A method comprising:

generating, based on historic vulnerability data that indicates whether each of multiple endpoints have previously been infected by each of multiple historic infections, respective vulnerability vectors for respective endpoints of the multiple endpoints;

grouping the respective vulnerability vectors according to similarity of the respective vulnerability vectors in order to identify multiple endpoint groups;

identifying an active infection of an affected endpoint among the multiple endpoints; and performing, in response to identifying the active infection, one or more endpoint group protection operations to protect endpoints in a same endpoint group as the affected endpoint.

18. The method of claim 17, wherein generating, based on the historic vulnerability data, the respective vulnerability vectors comprises constructing respective matrices based on the historic vulnerability data, wherein each respective matrix of the respective matrices comprises a respective endpoint to historic infection binary indicator matrix.

19. The method of claim 18, wherein generating, based on the historic vulnerability data, the respective vulnerability vectors further comprises applying singular value decomposition to the respective matrices.

20. The method of claim 17, wherein the respective vulnerability vectors are generates using latent semantic analysis of the historic vulnerability data.

* * * * *